United States Patent
Lindemann et al.

(10) Patent No.: US 7,663,898 B2
(45) Date of Patent: *Feb. 16, 2010

(54) SWITCHING POWER SUPPLY WITH DIRECT CONVERSION OFF AC POWER SOURCE

(75) Inventors: Andreas Lindemann, Magdeburg (DE); Nathan Zommer, Los Altos, CA (US)

(73) Assignee: IXYS Corporation, Santa Clara, CA (US)

( * ) Notice: Subject to any disclaimer, the term of this patent is extended or adjusted under 35 U.S.C. 154(b) by 524 days.

This patent is subject to a terminal disclaimer.

(21) Appl. No.: 11/147,669

(22) Filed: Jun. 7, 2005

(65) Prior Publication Data

US 2006/0007717 A1    Jan. 12, 2006

Related U.S. Application Data

(60) Provisional application No. 60/577,859, filed on Jun. 7, 2004.

(51) Int. Cl.
*H02M 7/127* (2006.01)
*H02M 7/06* (2006.01)
*G05F 1/00* (2006.01)

(52) U.S. Cl. .................. 363/127; 363/126; 323/222
(58) Field of Classification Search .......... 323/207, 323/237, 222; 363/89, 124, 16, 90, 125–127, 363/143
See application file for complete search history.

(56) References Cited

U.S. PATENT DOCUMENTS

| | | | |
|---|---|---|---|
| 4,740,723 A * | 4/1988 | Sugayama et al. .......... 327/440 |
| 4,780,660 A * | 10/1988 | Shima et al. ................. 323/207 |
| 5,245,522 A * | 9/1993 | Kawaguchi et al. ........... 363/37 |
| 5,635,826 A * | 6/1997 | Sugawara .................... 323/300 |
| 5,691,628 A * | 11/1997 | Martin ........................ 323/237 |
| 5,729,120 A * | 3/1998 | Stich et al. ................... 323/237 |
| 6,067,243 A * | 5/2000 | Suzuki et al. ................ 363/132 |
| 6,111,392 A * | 8/2000 | Iwahori et al. .............. 323/224 |
| 6,115,267 A * | 9/2000 | Herbert ......................... 363/25 |
| 6,236,192 B1 * | 5/2001 | Suzuki et al. ................ 323/239 |
| 6,606,257 B2 * | 8/2003 | Bourdillon ................ 363/21.12 |
| 6,639,388 B2 * | 10/2003 | Tihanyi ....................... 323/224 |
| 6,738,274 B2 * | 5/2004 | Prasad et al. ................... 363/70 |
| 6,771,056 B1 * | 8/2004 | Lindemann .................. 323/324 |
| 2002/0190696 A1 * | 12/2002 | Darshan ..................... 323/207 |

* cited by examiner

*Primary Examiner*—Jessica Han
*Assistant Examiner*—Emily Pham
(74) *Attorney, Agent, or Firm*—Townsend and Townsend and Crew LLP

(57) ABSTRACT

A power supply circuit, comprising a first reverse blocking transistor coupled to an AC power line; a second reverse blocking transistor coupled to the AC power line; a first inductor provided between the first reverse blocking transistor and the AC power line and configured to store energy; a first diode having a first terminal that is coupled to one end of the first inductor; a first capacitor having a terminal that is coupled to a second terminal of the first diode; and a first output terminal provided between the first diode and the first capacitor. The first and second transistors are arranged in an anti-parallel configuration and together define an AC switch.

17 Claims, 4 Drawing Sheets

SWITCHING POWER SUPPLY WITH DIRECT CONVERSION OFF AC POWER SOURCE

CROSS-REFERENCES TO RELATED APPLICATIONS

The present application claims priority to U.S. Provisional Application No. 60/577,859, filed on Jun. 7, 2004, which is incorporated by reference.

BACKGROUND OF THE INVENTION

The present invention relates to power devices, more particularly to a switching power supply that is configured to operate directly off an AC power source.

The conventional power transistors for switching applications, e.g., Bipolar Junction Transistors (BJT's), power MOSFETs or IGBTs, are basically DC switches. When they are turned on, they can conduct current in one direction, in compliance with the DC source. A power MOSFET has an intrinsic diode in the reverse direction. Thus it conducts current like a forward biased diode in the reverse direction and does not effectively block voltages in the reverse direction. An IGBT and a BJT have similar limitations, in that they have relatively low breakdown (BD) voltages in the reverse direction from about 12v to about 40v. The limitation of these transistors is explained in U.S. Pat. No. 5,851,857, which is incorporated by reference.

Accordingly, the current use of the transistors in switching power supply circuits is limited to switching DC. Typically, such power conversion systems are DC to DC converters, e.g. choppers or inverters, where the transistors are used in switching operation to convert DC electrical power to AC power, possibly of different frequency than that of the AC line power source.

FIG. 1 illustrates a power supply 100 including a pulse width modulation (PWM) inverter 102. The PWM inverter includes transistors that are used as switches in a PWM method. As explained above, such a transistor operates off a DC power source. This requires the rectification of the AC power source to DC. A rectifier 104 is used for this purpose, i.e., to convert AC to DC and then feed the DC to the PWM inverter. A storage capacitor C1 stores the DC power, i.e., serves as a DC energy reservoir to supply the DC power to the PWM inverter.

FIG. 2 shows a switching power supply including a power factor correction stage 202 and an inverter 204. The PFC stage 202 includes a bridge rectifier 206 that converts the AC line power source to DC power. One purpose of the PFC stage is to improve the poor AC input current waveforms.

The PFC stage also includes a controller 208, a switch 210, and an input filter 212. The switch 210 may comprise a MOSFET or IGBT. The inverter 204 includes a MOSFET switch 222 and a PWM controller 224.

An isolation transformer 226 coupled to the inverter outputs higher frequency electrical power. An output rectifier 228 receives the higher frequency power output by the transformer. An output filter 230 receive the output of the rectifier 228 and outputs DC power.

FIG. 3 illustrates a PFC stage 301 provided in a boost converter 300 (or power supply). The PFC stage includes a transistor T2, an inductor L1, a fast recovery diode D1, and a storage capacitor C2. A controller 302 is coupled to the control terminal of the transistor T2 and is configured to control the output of the PFC stage.

A rectifying stage 304 is provided between an AC input 306 and the PFC stage 301. The PFC stage receives the DC power from the rectifying stage and outputs the DC power to the inverter (not shown) with a boosted voltage. Regular power transistors configured to handle DC power are provided on the side of the inverter. The PFC stage is included in the boost converter in part to resolve the power factor problem associated with the input rectifying stage with its high DC voltage storage capacitor. This extra stage increase the number of components used, adds cost, increases the power dissipation, and reduces the efficiency.

FIG. 4 illustrates motor control circuit 400 with an input rectifying stage 402. The output of the PWM inverter is connected to a corresponding motor. The rectifying stage 402 converts AC from a three-phase AC line to DC, which is then fed to switching circuits 404 including a plurality of transistors.

As described above, the transistors in the conventional power supply circuits are configured to handle DC power not AC power. Accordingly, a rectifying circuit is provided between the transistors and the AC power line. However, it is desirable to operate directly off the AC line if possible. It would be desirable to provide a power supply circuit that is configured to operate directly off the AC power line using one or more power transistors.

BRIEF SUMMARY OF THE INVENTION

Embodiments of the present invention relate to use of reverse blocking IGBTs (RIGBT's) to simplify power supply circuits by reducing the number of components needed for input rectification and power factor control.

As used herein, the term "reverse blocking transistor" or "reverse blocking IGBT" or "RIGBT" refers a transistor that is configured to handle a high reverse voltage, so that the transistor has high blocking voltages in both directions. These three terms are used herein interchangeably for illustrative convenience.

In one embodiment, a power supply circuit, comprising a first reverse blocking transistor coupled to an AC power line; a second reverse blocking transistor coupled to the AC power line; a first inductor provided between the first reverse blocking transistor and the AC power line and configured to store energy; a first diode having a first terminal that is coupled to one end of the first inductor; a first capacitor having a terminal that is coupled to a second terminal of the first diode; and a first output terminal provided between the first diode and the first capacitor. The first and second transistors are arranged in an anti-parallel configuration and together define an AC switch. The power supply circuit further comprises a controller configured to turn on or off the first transistor; and a feedback circuit to receive an output from the first output terminal and provide a feedback signal to the controller.

In another embodiment, a power supply circuit comprises first and second rails coupled to an AC power source; an AC switch coupled to the first and second rails to receive AC currents, the AC switch including first and second transistors in an anti-parallel configuration; and an output section coupled to the AC switch to receive currents from the AC switch and output power. The AC switch is a bidirectional-bipolar switch, wherein the first and second transistors are reverse blocking transistors, the first transistor being configured to be turned on during a positive half cycle, the second transistor being configured to turned on during a negative half cycle.

In another embodiment, a power supply circuit comprises a first reverse blocking transistor coupled to an AC power line; a second reverse blocking transistor coupled to the AC power line; a first inductor provided between the first reverse blocking transistor and the AC power line and configured to store energy; and a first output terminal configured receive energy from the first inductor and output DC voltages.

In yet another embodiment, a method for operating a power supply circuit configured for outputting a DC voltage is disclosed. The power supply circuit includes first and second rails coupled to an AC power source; an AC switch coupled to the first and second rails to receive AC currents, the AC switch including first and second transistors in an anti-parallel configuration; and an output section coupled to the AC switch to receive currents from the AC switch and output power, wherein the output section includes first and second diodes and first and second capacitors.

The method for operating the power supply circuit comprises switching on the first transistor to magnetize an inductor using current of a first polarity; turning off the first transistor to demagnetize the inductor and charge the first capacitor via the first diode; switching on the second transistor to magnetize the inductor using current of a second polarity that is different from the first polarity; turning off the second transistor to demagnetize the inductor and charge the second capacitor via the second diode, wherein a DC voltage is output by the output section.

The first and second capacitors are provided with first and second voltages, wherein the first and second voltages are controlled to be substantially the same.

The first and second capacitors are provide with first and second voltages, wherein the first and second voltages are controlled to be independent from mains voltage in operating range, thereby achieving a wide input voltage range.

Mains current is controlled through the magnetization and demagnetization of the inductor in the first and second polarities of current to approximate a desired waveform. The desired current waveform is a sinewave in phase to mains voltage. The desired current waveform compensates mains harmonics, so that the circuit is controlled to act as an active filter.

DETAILED DESCRIPTION OF THE INVENTION

The present invention relates to power supply circuits. In one embodiment, one or more reverse blocking transistors are used in a power supply circuits to operate directly off the AC line. The examples of the reverse blocking transistor is RIGBT that is configured to block AC voltage in both directions when it is in OFF state. The RIGBT is described in more details in U.S. Pat. No. 6,771,056, which is incorporated by reference.

In the present embodiment, a power supply circuit with one or more RIGBTs is configured to operate without the use of a separate rectifying stage that converts the AC power to DC power. The present power supply circuit uses two RIGBTs in an anti-parallel configuration. The circuit is configured to switch the AC power directly off the AC line without rectification, which reduces the cost and complexity of the power supply circuit. Also, since the power supply is configured to work directly off the AC line, there is no need for a rectified DC stage with a reservoir capacitor. This eliminates the primary reason for introducing a separate Power Factor Correction (PFC) stage as in the conventional "off line" switching power supply circuits.

Figure 1:
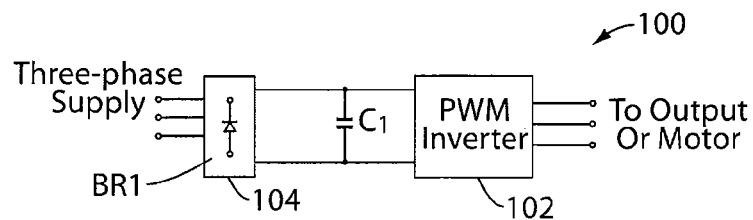
FIG. 1 illustrates a power supply 100 including a pulse width modulation (PWM) inverter.
Figure 2:
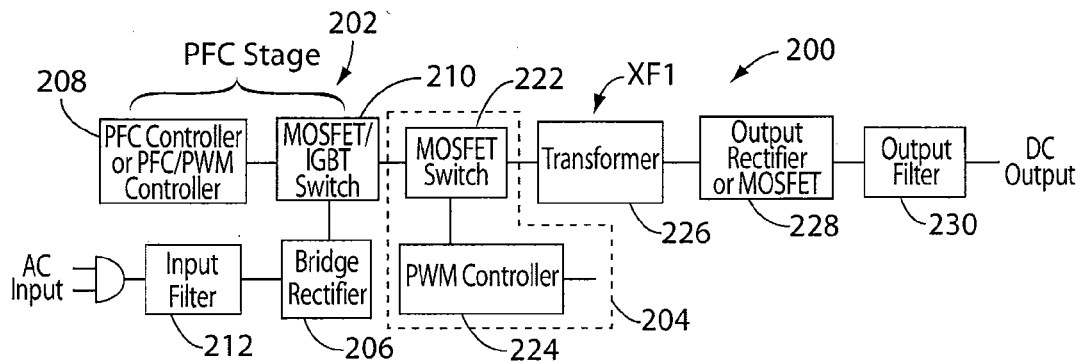
FIG. 2 shows a switching power supply including a power factor correction stage and an inverter.
Figure 3:
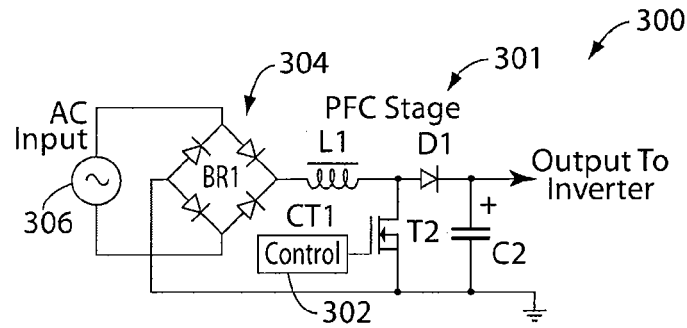
FIG. 3 illustrates a PFC stage provided in a boost converter (or power supply).
Figure 4:
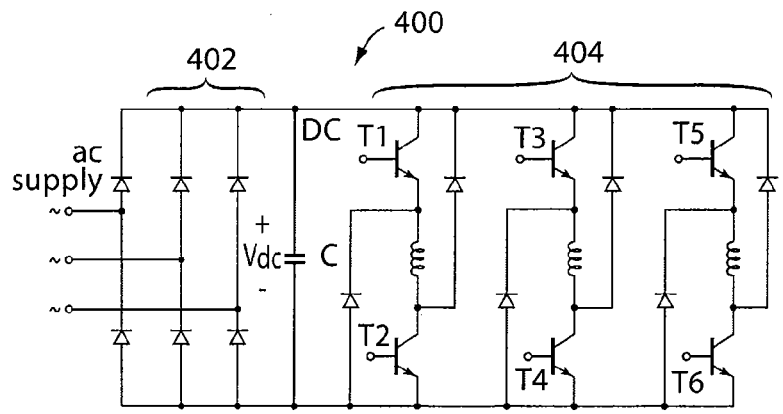
FIG. 4 illustrates motor control circuit with an input rectifying stage.
Figure 5:
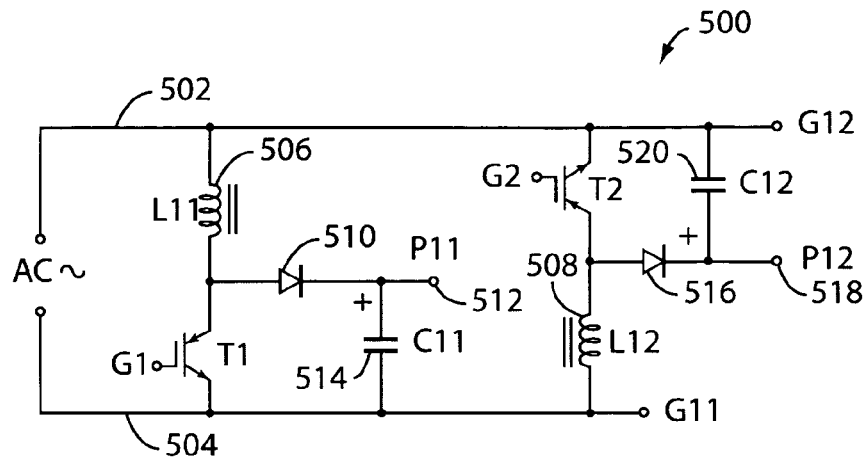
FIG. 5 illustrates a power supply circuit according to one embodiment of the present invention.

FIG. 5 illustrates a power supply circuit 500 according to one embodiment of the present invention. The power supply circuit includes a first rail G12 (or 502) and a second rail G11 (or 504) that are coupled to the AC power supply. First and second power transistors (e.g., RIGBTs) T1 and T2 are provided between the first and second rails 502 and 504. The first RIGBT T1 is configured to operate in the positive half cycle, and has its collector coupled to the first rail 502 via an inductor 506, and its emitter coupled to the second rail 504. The second RIGBT T2 is configured to operate in the negative half cycle, and has its emitter coupled to the first rail 502, and its collector coupled to the second rail 504 via an inductor 508. The gates G1 and G2 of the two RIGBTs are coupled to a controller (not shown) that controls the on or off states of each of RIGBTs.

A first diode 510 is coupled to the collector of the RIGBT T1 and a first output node P11 (or 512). A first capacitor C11 (or 514) is provided between the first output node and the second rail 504. The first diode is a fast recovery diode in the present implementation.

A second diode 516 is coupled to the collector of the RIGBT T2 and a second output node P12 (or 518). The second diode is a fast recovery diode in the present implementation. A second capacitor C12 (or 520) is provided between the second output node and the first rail 502. The power circuit is a boost converter circuit and provides a DC voltage in the corresponding first and second capacitors C11 and C12 (or the first and second output nodes). As a result, two high DC voltage outputs P11 and P12 are provided by the power supply circuit 500. These DC voltages are output to inverter circuits.

Figure 6:
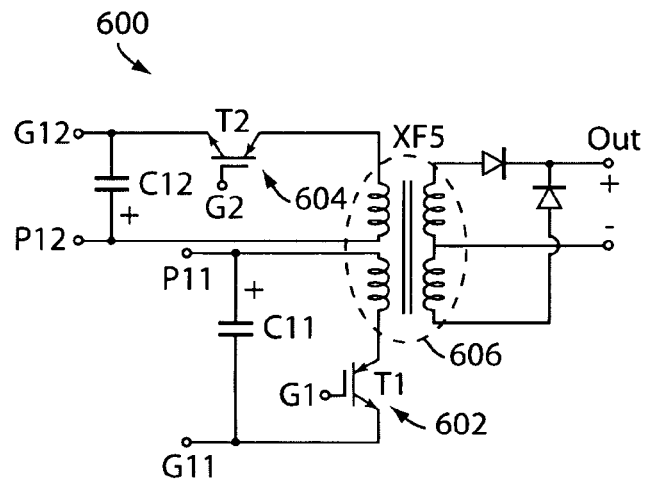
FIG. 6 illustrates an inverter stage having two transistors according to one embodiment of the present invention.

FIG. 6 illustrates an inverter stage 600 having two transistors according to one embodiment of the present invention. A first transistor 602 is a power MOSFET and receives its power from the first output node P11 (see FIG. 5). A second transistor 604 is a power MOSFET and receives its power from the second output node P12. The gates of these MOSFETs are coupled to a controller, which turns on or off the MOSFETs in different phases or different timing. A high frequency transformer XF5 (or 606) transfers the energy to the output of the corresponding power supply. The transformer preferably is an integrated transformer. Different types of inverters may used in other implementations, where such inverter circuits can operate in many modes of operation, e.g., fly back, forward converter, and multiphase mode.

Figure 7:
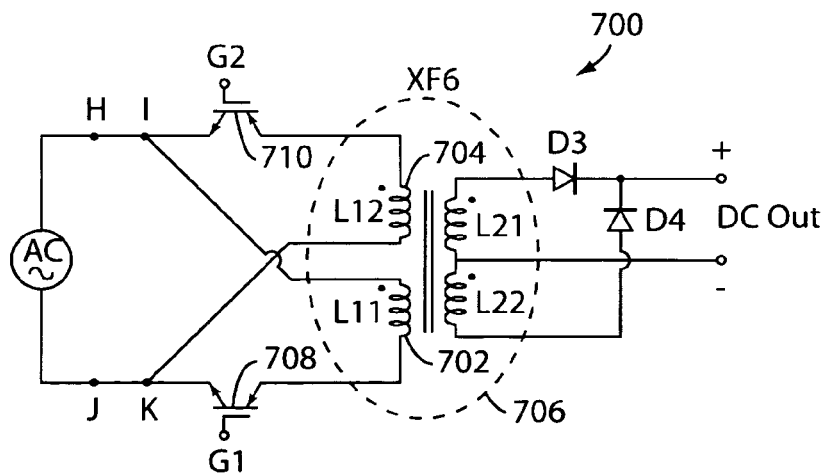
FIG. 7 illustrates a power supply circuit according to one embodiment of the present invention.

FIG. 7 illustrates a power supply circuit 700 according to one embodiment of the present invention. In the present implementation, first and second windings (or inductors) 702 and 704 are provided using a single magnetic core to form a high frequency transformer XF6 (or 706). The transformer XF6 includes windings L21 and L22 that are coupled to diodes D3 and D4. A first RIGBT 708 is coupled to the first winding, and a second RIGBT 710 is coupled to the second winding. Filters and other passive components may be provided between points H and I and points J and K in series or parallel mode. The power supply circuit 700 enables "direct power conversion from the AC line" technology (or DPAC technology). That is, the power supply circuit converts the AC power directly to DC power in the output, with power factor correction (PFC), but without the input rectifying bridge.

Figure 8:
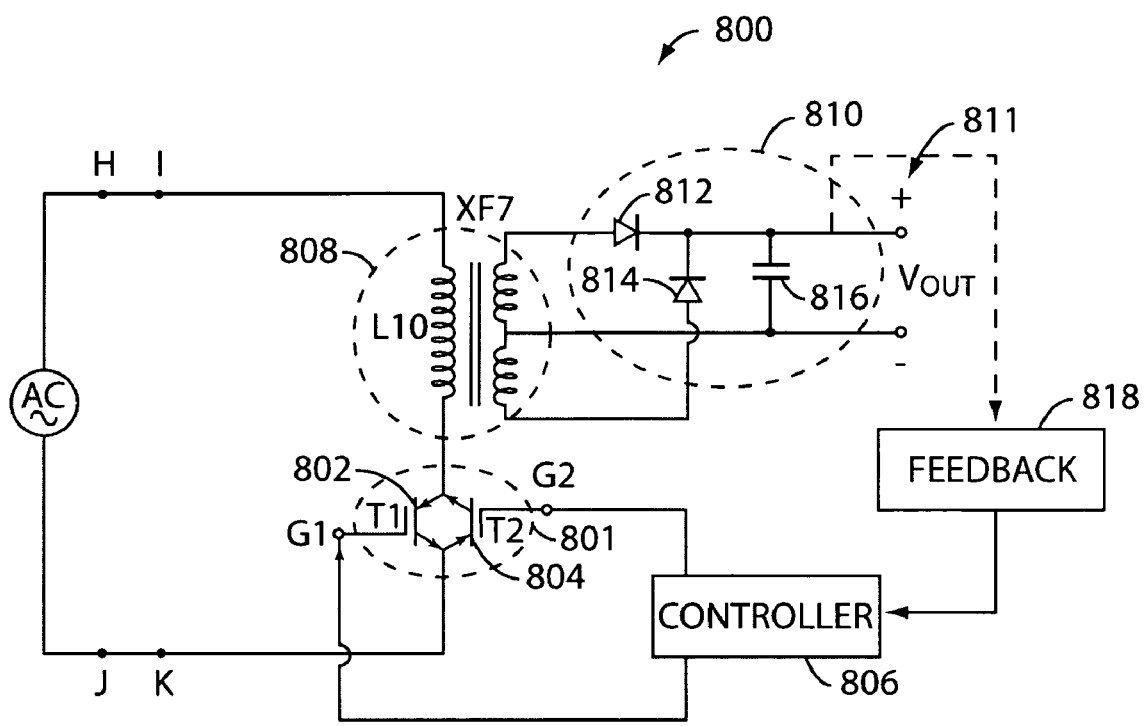
FIG. 8 illustrates a power supply circuit according to one embodiment of the present invention.

FIG. 8 illustrates a power supply circuit 800 according to one embodiment of the present invention. The power supply circuit 800 includes an AC switch 801, which includes first and second RIGBTs 802 and 804 in an anti-parallel configuration. The AC switch provides PFC and power conversion, directly off the AC input power (or DPAC). A controller 806 is coupled to the gates of the RIGBTs to drive the transistors according to the AC power cycle. The first RIGBT 802 is mainly switched during the positive half cycle, and the second RIGBT 804 is mainly switched during the negative half cycle.

A transformer XF7 (or 808) transfers the power to an output section 810. The output section 810 includes an output node 811, first and second diodes 812 and 814, and capacitor 816. The power pulses are transformed according to the windings of the transformer XF7 to the output section, where they are rectified by the first and second diodes to a DC output voltage Vout.

A feedback circuit 818 is coupled to the output node and receives the power output and provides a feedback signal to the controller 806 (preferably with isolation), where the feedback signal is used to drive the RIGBTs.

The feedback circuit and the controller preferably provide a closed loop control system, where the controller 806 is configured to combine the effective PWM control function of a power supply and the PFC function. With such a closed loop system, it is possible to control the in-rush current during power turn-on and reduce current spikes when the power is turned on for the power supply. Other types of power supply circuits can be designed using the AC switch above to design a power supply circuit which performs the PFC function and can operate directly off the AC power line.

The power supply circuit 800 is configured to convert AC power to DC directly from the AC line without using a rectifier. The DC power is outputted to an inverter or another circuit. The DC power may be outputted to a single output or multiple outputs according to applications.

Figure 9:
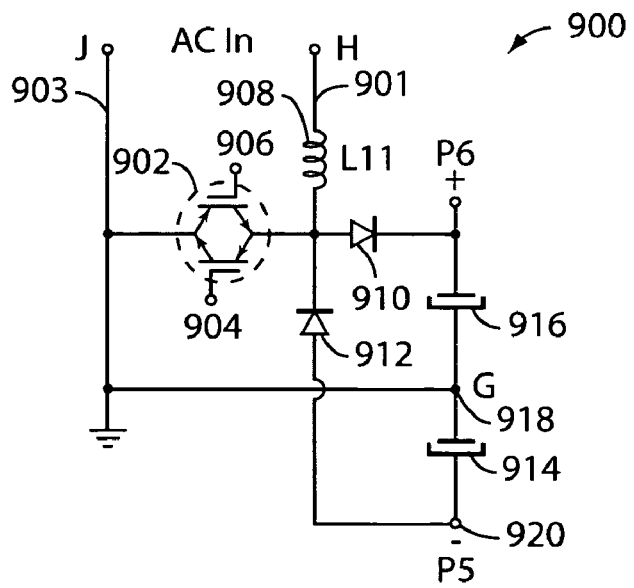
FIG. 9 illustrates a power supply circuit according to one embodiment of the present invention.

FIG. 9 illustrates a power supply circuit 900 according to one embodiment of the present invention. The power supply circuit 900 is a voltage doubler rectifier. The power supply circuit includes an AC switch 902 that is configured to receive AC power from the AC line. The switch is a bidirectional-bipolar switch in the present implementation. The switch is provided between first and second rails 901 and 903 and includes a first RIGBT 904 and a second RIGBT 906 that are arranged in an anti-parallel configuration. An inductor 908 is provided on the first rail 901. The inductor is sized for the desired current. One end of the inductor is coupled to a node between first and second diodes 910 and 912. A first capacitor 916 is provided between an upper terminal P6 and a intermediate terminal 918. A second capacitor 914 is provided between a lower terminal 920 and the intermediate terminal 918.

The first RIGBT is configured to be mainly turned on during the positive half cycle, i.e., when input H is higher in voltage than input J. The second RIGBT is mainly pulsed on and off to charge and discharge the inductor during the negative half cycle. As a result, the first capacitor is charged via the first diode 910 and builds up a desired DC voltage across the first capacitor.

On the negative half cycle, the second RIGBT 906 is configured to turned on in similar mode to the first RIGBT and charge and discharge the inductor 908. As a result, the second capacitor 914 is charged via the second diode. The intermediate terminal is charged to have a higher potential than the lower terminal 920. This results a double DC voltage output between the upper and lower terminals P6 and 920. This higher DC voltage is output to an external circuit, e.g., an inverter stage, for further DC to DC conversion in a power supply, UPS, motor control or other suitable power systems.

In the present embodiment, a controller (not shown) is used to drive the RIGBTs in the AC switch 902. The controller comprises two drivers that are galvanically isolated and provides a separate driver for each of the two RIGBTs.

Figure 10A:
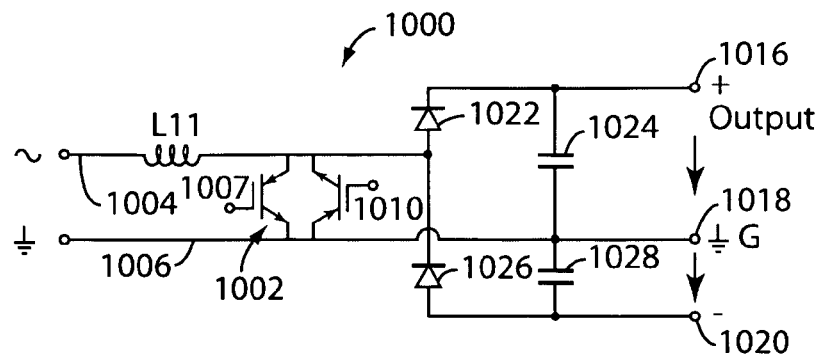
FIG. 10A illustrates a power supply circuit according to one embodiment of the present invention.

FIGS. 10A-10E illustrate the operations of a power supply circuit according to one embodiment of the present invention. FIG. 10A illustrates a power supply circuit 1000 corresponding to the power supply circuit 900. The power supply circuit 1000 includes an AC switch 1002. The AC switch is provided between first and second rails 1004 and 1006 and is configured to receive AC power directly from the AC line (i.e., without the AC current being rectified). An inductor L11 is provided between the first rail and the AC switch to store energy.

The AC switch is a bidirectional-bipolar switch that includes first and second RIGBTs 1007 and 1010 that are in an anti-parallel configuration. The first RIGBT 1007 is configured to be mainly switched during the positive half cycle. Accordingly, the collector of the first RIGBT is coupled to the first rail, and the emitter of the first RIGBT is coupled to the second rail. The second RIGBT 1010 is configured to turn on during the negative half cycle. The collector of the second RIGBT is coupled to second rail, and the emitter of the second RIGBT is coupled to the first rail. The first and second RIGBTs are configured to have high reverse blocking voltages, so that unwanted reverse current flows can be prevented.

The power supply circuit 1000 includes a voltage booster stage that is configured to boost the voltage and then output the step-up voltage, e.g., to an inverter (not shown). An upper terminal 1016, an intermediate terminal 1018, and a lower terminal 1020 are used to output the step-up voltage. A first diode 1022 and a first capacitor 1024 are provided in parallel between the upper and intermediate terminals. A second diode 1026 and a second capacitor 1028 are provided in parallel between the intermediate and lower terminals.

Figure 10B:
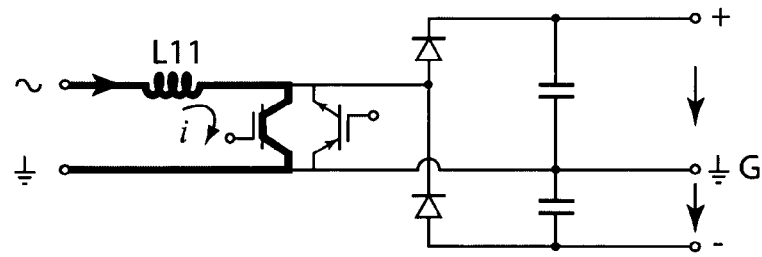
FIG. 10B illustrates the current flow when the first RIGBT is turned on during the positive half cycle.

FIG. 10B illustrates the current flow when the first RIGBT is turned on during the positive half cycle. The current flows through the inductor and the first RIGBT from the first rail to the second rail. The inductor is magnetized and stores energy therein. The second RIGBT is kept off by the negative collector-emitter voltage applied during this half cycle.

Figure 10C:
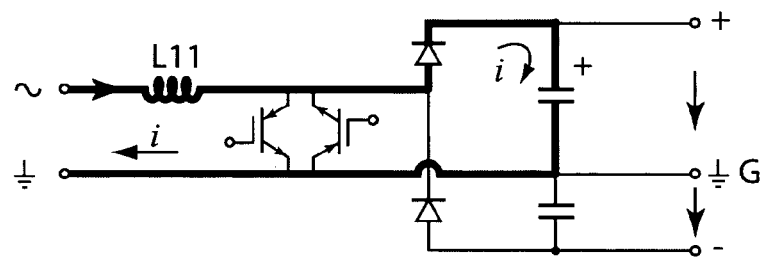
FIG. 10C illustrates the current flow when the first RIGBT is turned off.

FIG. 10C illustrates the current flow when the first RIGBT is turned off. Since both of the RIGBTs have high blocking voltages, no current flows through them. The energy stored in the inductor pushes the current through the first diode to charge the first capacitor and output a step-up voltage.

Figure 10D:
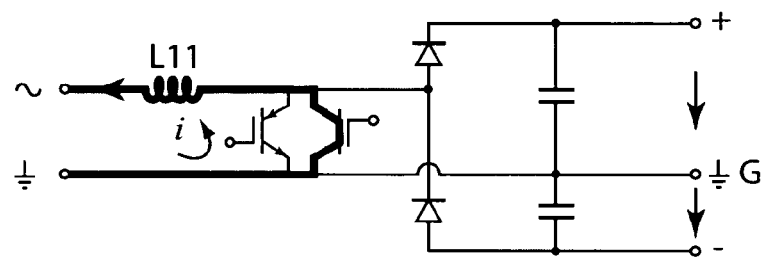
FIG. 10D illustrates the current flow when the second RIGBT is turned on during the negative half cycle.

FIG. 10D illustrates the current flow when the second RIGBT is turned on during the negative half cycle. The current flows through the inductor from the second rail to the first rail. The inductor is magnetized and stores energy therein. The first RIGBT is kept off by the negative collector-emitter voltage applied during this half cycle.

Figure 10E:
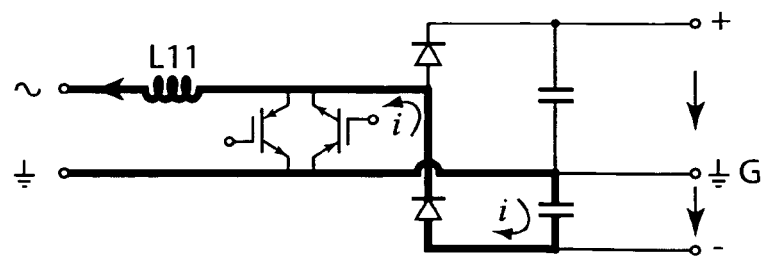
FIG. 10E illustrates the current flow when the second RIGBT is turned off.

FIG. 10E illustrates the current flow when the second RIGBT is turned off. Since both of the RIGBTs are in the blocking mode, the current does not flow through them. The current, rather, charges the second capacitor. The current then flows through the second diode and then through the inductor. Another step-up voltage mainly fed during the negative half cycle is thus output, e.g., to an inverter (not shown).

The present invention has been described in terms of specific embodiments. As will be understood by those skilled in the art, the embodiment disclosed above may be altered or modified without departing from the scope of the present invention. The scope of the invention should be interpreted using the appended claims.

What is claimed is:

1. A power supply circuit, comprising:
   a first reverse blocking transistor coupled to a first terminal of an AC power source;
   a second reverse blocking transistor coupled to a second terminal of the AC power source;
   a first inductor provided between a collector of the first reverse blocking transistor and the second terminal of the AC power source and configured to store energy;
   a second inductor provided between a collector of the second reverse blocking transistor and the second terminal of the AC power source; and
   a first output terminal provided between the first inductor and the first reverse blocking transistor, wherein the first output terminal is configured to receive energy from the first inductor and output DC voltages,
   wherein the first reverse blocking transistor switches to magnetize the first inductor while current flow through the second reverse blocking transistor is blocked, and the second reverse blocking transistor switches to magnetize the second inductor while current flow through the first reverse blocking transistor is blocked.

2. The power supply circuit of claim 1, wherein the first and second reverse blocking transistors are arranged for opposite polarities of current.

3. The power supply circuit of claim 1, wherein the power supply circuit is configured to convert the AC power directly to DC power and provide power factor correction.

4. The power supply circuit of claim 1, wherein the first transistor is a reverse blocking Insulated Gate Bipolar Transistor (RIGBT), and the second transistor is a RIGBT.

5. The power supply circuit of claim 4, wherein the first reverse blocking transistor is configured to turn on during a first half cycle, and the second reverse blocking transistor is configured to turn on during a second half cycle.

6. A power supply circuit, comprising:
   first and second rails coupled to an AC power source;
   an AC switch coupled to the first and second rails to receive AC currents, the AC switch including first and second transistors in an anti-parallel configuration, wherein the first transistor switches to magnetize an inductor while current flow through the second transistor is blocked, and the second transistor switches to magnetize the inductor while current flow through the first transistor is blocked; and
   an output section coupled to the AC switch to receive currents from the AC switch and output power, wherein the output section is a voltage doubler rectifier, the output section including first and second diodes and first and second capacitors, the first diode being configured to charge the first capacitor with current of one polarity, the second diode being configured to charge the second capacitor with current of the opposite polarity,
   wherein a node between the first and second capacitors is connected to one of the rails of the AC power source.

7. The power supply circuit of claim 1, further comprising:
   a first diode having a first terminal that is coupled to one end of the first inductor; and
   a first capacitor having a terminal that is coupled to a second terminal of the first diode, wherein the first output terminal is provided between the first diode and the first capacitor.

8. The power supply circuit of claim 1, wherein the first and second inductors use the same core.

9. The power supply circuit of claim 1, further comprising:
   a controller configured to turn on or turn off the first reverse blocking transistor; and
   a feedback circuit to receive an output from the first output terminal and provide a feedback signal to the controller.

10. A power supply circuit, comprising:
    first and second rails coupled to an AC power source;
    an AC switch coupled to the first and second rails to receive AC currents, the AC switch including first and second transistors in an anti-parallel configuration, wherein the AC switch is a bidirectional-bipolar switch and the first and second transistors are reverse blocking transistors, the first transistor being configured to switch current of one polarity, the second transistor being configured to switch current of opposite polarity; and
    an output section coupled to the AC switch to receive currents from the AC switch and output a DC voltage,
    wherein the first transistor switches to magnetize an inductor while current flow through the second transistor is blocked, and the second transistor switches to magnetize the inductor while current flow through the first transistor is blocked.

11. A method for operating a power supply circuit configured for outputting a DC voltage, the power supply circuit including first and second rails coupled to an AC power source; an AC switch coupled to the first and second rails to receive AC currents, the AC switch including first and second transistors in an anti-parallel configuration; and an output section coupled to the AC switch to receive currents from the AC switch and output power, wherein the output section includes first and second diodes and first and second capacitors,
    wherein the method comprises:
    switching on the first transistor to magnetize an inductor using current of a first polarity;
    turning off the first transistor to demagnetize the inductor and charge the first capacitor via the first diode;
    switching on the second transistor to magnetize the inductor using current of a second polarity that is different from the first polarity;
    turning off the second transistor to demagnetize the inductor and charge the second capacitor via the second diode; and
    controlling current of the AC power source through the magnetization and demagnetization of the inductor in the first and second polarities of current to approximate a desired waveform,
    wherein a DC voltage is output by the output section.

12. The method according to claim 11, wherein the first and second capacitors are provided with first and second voltages, wherein the first and second voltages are controlled to be substantially the same.

13. The method according to claim 11, wherein the first and second capacitors are provided with first and second voltages, wherein the first and second voltages are controlled to be independent from the AC power source's voltage in operating range, thereby achieving a wide input voltage range.

14. The method according to claim 11, wherein the desired current waveform is a sinewave in phase with a voltage of the AC power source.

15. The control method according to claim 11, wherein the desired current waveform compensates for harmonics of the AC power source, so that the circuit is controlled to act as an active filter.

16. A power supply circuit, comprising:
a first reverse blocking transistor coupled to an AC power line;
a second reverse blocking transistor coupled to the AC power line;
a first inductor provided between the first reverse blocking transistor and the AC power line and configured to store energy, wherein the first reverse blocking transistor switches to magnetize the first inductor while current flow through the second reverse blocking transistor is blocked, and the second reverse blocking transistor switches to magnetize the first inductor or a second inductor while current flow through the first reverse blocking transistor is blocked;
a first diode having a first terminal that is coupled to one end of the first inductor;
a first capacitor having a first terminal that is coupled to a second terminal of the first diode;
a first output terminal provided between the first diode and the first capacitor, wherein the first output terminal is configured to receive energy from the first inductor and output DC voltages;
a second capacitor having a first terminal that is coupled to a second terminal of the first capacitor;
a second output terminal provided between the first capacitor and the second capacitor;
a second diode having a first terminal that is coupled to the first terminal of the first diode and having a second terminal that is coupled to a second terminal of the second capacitor; and
a third output terminal provided between the second diode and the second capacitor,
wherein the second output terminal and the third output terminal are configured to output DC voltages such that a potential at the second output terminal is higher than a potential at the third output terminal.

17. The power supply circuit of claim 6, wherein the first and second diodes are fast recovery diodes.

* * * * *

UNITED STATES PATENT AND TRADEMARK OFFICE
CERTIFICATE OF CORRECTION

PATENT NO. : 7,663,898 B2 Page 1 of 1
APPLICATION NO. : 11/147669
DATED : February 16, 2010
INVENTOR(S) : Lindemann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 952 days.

Signed and Sealed this

Thirtieth Day of November, 2010

David J. Kappos
*Director of the United States Patent and Trademark Office*